United States Patent [19]
Weber et al.

[11] Patent Number: 5,855,838
[45] Date of Patent: Jan. 5, 1999

[54] METHOD AND APPARATUS FOR BLOW-MOLDING HOLLOW ARTICLES

[75] Inventors: Lawrence H. Weber, Ypsilanti; David M. Johnson, Saline, both of Mich.

[73] Assignee: R & B Machine Tool Company, Saline, Mich.

[21] Appl. No.: 866,614

[22] Filed: May 30, 1997

Related U.S. Application Data

[62] Division of Ser. No. 567,778, Dec. 5, 1995, Pat. No. 5,665,404.

[51] Int. Cl.$^6$ ..................................................... B29C 49/24
[52] U.S. Cl. ........................... 264/509; 264/543; 425/503; 425/540
[58] Field of Search .................................. 264/509, 543, 264/538; 425/503, 540

[56] References Cited

U.S. PATENT DOCUMENTS

| | | | |
|---|---|---|---|
| 3,204,018 | 8/1965 | Hagen | 264/98 |
| 3,275,726 | 9/1966 | Rudolph | 264/98 |
| 3,327,035 | 6/1967 | Parfery | 264/543 |
| 3,555,598 | 1/1971 | Mehnert | 18/5 |
| 3,776,991 | 12/1973 | Marcus | 264/89 |
| 3,854,855 | 12/1974 | Pollock et al. | 425/142 |
| 3,878,282 | 4/1975 | Bonis et al. | 264/97 |
| 3,936,521 | 2/1976 | Pollock et al. | 264/98 |
| 3,941,863 | 3/1976 | Pollock et al. | 264/98 |
| 3,979,491 | 9/1976 | Zavasnik | 264/97 |
| 4,233,019 | 11/1980 | Sawa et al. | 425/305.1 |
| 4,421,472 | 12/1983 | Martin, Jr. | 425/527 |
| 4,439,127 | 3/1984 | Frohn | 425/155 |
| 4,456,118 | 6/1984 | Kauffman et al. | 198/480 |
| 4,582,474 | 4/1986 | Ziegler | 425/503 |
| 4,801,260 | 1/1989 | Oles et al. | 425/540 |
| 4,834,643 | 5/1989 | Klinedinst et al. | 425/537 |
| 4,902,217 | 2/1990 | Martin et al. | 425/537 |
| 4,919,607 | 4/1990 | Martin et al. | 425/531 |
| 5,229,143 | 7/1993 | Ogura et al. | 425/540 |

FOREIGN PATENT DOCUMENTS

| | | |
|---|---|---|
| 659146 | 8/1965 | Belgium . |
| 2165922 | 6/1990 | Japan . |

Primary Examiner—Catherine Timm
Attorney, Agent, or Firm—Reising, Ethington, Learman & McCulloch, PLLC

[57] ABSTRACT

A method and an apparatus are provided for blow-molding hollow articles. The blow-molding apparatus includes a carrousel mounted to rotate within a support frame. The carrousel carries four molds around a circular mold path. Two blow-molding work stations are disposed next to the mold path in fixed positions relative to the frame. The carrousel is indexed to cause each mold to pause by each work station one time during each carrousel revolution. The molds pause by each work station to allow blow-molding operations to be performed in conjunction with each mold at each work station. At one blow-molding work station, located at the 12:00 position of the mold path, an extruder injects parison into each mold. At the other work station, located in the 9:00 position of the mold path, a take-out mechanism extracts blow molded articles from the molds. The carrousel is additionally indexed, i.e., "double-indexed", to cause each mold to pause in the 10:30 position of the mold path where an in-mold labeling mechanism inserts a label into each mold.

16 Claims, 2 Drawing Sheets

METHOD AND APPARATUS FOR BLOW-MOLDING HOLLOW ARTICLES

This is a divisional of application Ser. No. 08/567,778 filed on Dec. 5, 1995, now U.S. Pat. No. 5,665,404.

TECHNICAL FIELD

This invention relates generally to blow molding and, more particularly, to blow molding hollow articles using an apparatus with a plurality of molds mounted on a rotary carrousel.

BACKGROUND OF THE INVENTION

Current blow-molding machinery is designed to manufacture hollow plastic containers by extruding a parison between opposed, parted mold halves. The mold is then closed and air is injected into the parison, blowing and distending it outward so that it conforms itself to the inner contours of the mold which match the outer shape of the bottle to be produced. The newly-formed container is allowed to harden, then is extracted or dropped from the mold.

Some plastic bottle manufacturers produce blow-molded articles by using rotary blow-molding machines. A typical rotary blow-molding machine includes a rotating carrousel that carries two or more mold stations around a circular mold station path. Each mold station includes a mold with a mold cavity. The carrousel is indexed to hold each mold station momentarily motionless at each of a series of blow molding "work stations". For the purposes of this application a "work station" will be defined as a position where each mold station must pause in its circular path for a particular operation to be carried out. A "work station series" will be defined as a progression of work stations necessary to complete a blow molding process on a single mold station in a single carrousel revolution. Blow molding operations are carried out sequentially on each mold as each mold station rotates through a work station series, pausing momentarily at each work station in the series.

Rotary blow-molding machines may, of course, include any number of mold and work stations, and may include more than one work station series arranged around a single mold station path. In rotary blow-molding machines with a single work station series, there is a simple relationship that determines the minimum number of carrousel indexing positions: The carrousel must pause in a number of indexing positions that is at least equal to the number of work stations in the series and at least equal to the number of mold stations. The reason for this is that each mold station must pause at each work station in the series one time during each carrousel rotation to complete the blow molding process at each mold station. As long as the number of mold stations is equal to or greater than the number of blow-molding work stations where each mold station must pause, then the carrousel must index at least as many times as there are mold stations. If, for example, there are only two mold stations spaced 180 degrees apart, and only one work station where each mold station must pause, the carrousel must index 180 degrees twice during each rotation to make each mold station stop at the work station one time.

In many rotary blow molding machines the only blow-molding operations that require a mold station to pause at a fixed work station are the parison-extrusion and article-release operations. However, following the extrusion station and preceding the release station the process requires that there be sufficient "blow time" and cooling time for each blow-molded article to properly form and harden in the cavity within each mold.

To provide sufficient "blow time" and cooling time, designers usually position the release station to immediately precede the extrusion station. This causes each mold and mold station to travel a large angular distance around the mold station path from the extrusion station to the release station, and a smaller angular distance from the release station back to the extrusion station. The average carrousel angular velocity must be slow enough to allow each mold sufficient "blow time" and cooling time as it travels this angular distance.

By adding more mold stations and indexing pauses to a carrousel, designers are able to minimize the impact that these cooling and "blow time" requirements have on the total average time it takes to produce a blow-molded bottle. While cooling and blow-time requirements must generally remain the same, additional mold stations and indexing pauses allow more extrusion and release operations to occur per revolution. However, carrousel space limitations and the absence of a work station in the typically small angular distance between the release station and the extrusion station make it difficult to add another operation, such as in-mold labeling, to the blow-molding process.

Current rotary blow-mold carrousels are generally designed to index a number of times equal to the number of mold stations supported on the carrousel. For example, U.S. Pat. Nos. 3,854,855, 3,936,521 and 3,941,863 to Pollock et al., each disclose six-mold-station carrousels that index six times per revolution; U.S. Pat. No. 4,439,127 to Frohn discloses a five-mold-station carrousel that indexes five times per revolution; and U.S. Pat. No. 4,233,019 to Sawa et al., U.S. Pat. No. 4,834,643 to Klinedinst et al. and Japanese Pat. No. 402,165,922A to Calsonic et al. each disclose four-mold-station carrousels that index four times per revolution.

The reason that engineers design rotary blowmolder carrousels to index a number of times equal to the number of mold stations is because the carrousel must index at least this number of times to cause each mold station to pause at each work station. However, as designers increase the number of mold stations in a rotary blow-molder, they must either enlarge the carrousels to accommodate the larger number of mold stations, or must make the mold stations smaller—so that more can fit on the same size carrousel.

Moreover, for designers to add additional operations such as in-mold labeling to rotary blow molding machines with, as is found in the prior art, the same number of indexing positions as mold stations, they must displace the article take-out work station with the new in-mold labeling apparatus. This requires that the take-out work station be re-located to the next preceding work station along the mold station path. This, in turn, compresses all other blow molding operations, including cooling and blowing, into a smaller portion of the mold station path. This compression would require the carrousel to either be larger or to rotate more slowly to allow sufficient cooling and blow time. It would also constitute an inefficient use of the latter portion of the mold station path between the relocated take-out station and the extrusion station.

What is needed is a rotary blowmolding apparatus that allows additional operations to be performed on each mold between the release and extrusion stations without increasing the number of mold stations mounted on the carrousel, without compressing blow molding operations into the early portion of the mold station path following parison extrusion, and while maximizing the portion of the mold station path used for blowing and cooling.

SUMMARY OF THE INVENTION

In accordance with one aspect of this invention, a rotary blow-molding apparatus is provided with a carrousel that "double-indexes", i.e., that pauses in twice as many indexing positions as there are mold stations. The apparatus includes a support frame, a carrousel rotatably supported on the frame, and at least two mold stations supported on the carrousel to rotate along a circular mold station path. Each mold station includes at least one mold with at least one mold cavity adapted to hold an article during blow molding. A parison-extrusion work station and an article-release work station are each disposed adjacent the frame and are spaced around the mold station path. A parison extruder including at least one extrusion head is supported on the frame at the parison-extrusion work station. The extruder is adapted to extrude parison into each mold through the extrusion head. An indexer is operatively connected to the carrousel and is adapted to pause the carrousel in a number of indexing positions. The indexing positions and work stations are angularly spaced so that each mold station pauses in angular alignment with each work station allowing operations to be performed on each mold station at each work station. The indexer is further adapted to pause the carrousel in twice as many indexing positions as there are mold stations to allow at least one additional operation to be carried out on each mold station following the article-release work station and prior to the parison-extrusion work station.

In accordance with another aspect of this invention, the carrousel includes four mold stations and the indexer is adapted to pause the carrousel in eight indexing positions per revolution. This provides one additional indexing position between the take out and extrusion stations where an additional work station may be located.

In accordance with another aspect of this invention, an in-mold labeler is disposed adjacent the mold station path and is adapted to insert a label into each mold following the article-release work station and prior to the parison-extrusion work station. The in-mold labeling process provides superior label adhesion and its inclusion in the blow-molding process saves considerable time by eliminating the need to affix a label after the blow molding process is complete.

In accordance with another aspect of this invention, each mold station includes more than one mold. Each additional mold increases the article production rate of a rotary blow molding machine by a factor equal to the total number of molds included in each mold station.

In accordance with another aspect of this invention a method is provided for molding articles using a rotary blow-molding assembly. The method includes the steps of indexing the carrousel to rotate a mold station into a position adjacent a parison-extrusion work station, injecting parison into a mold cavity in the mold station, injecting air into the parison, indexing the carrousel to rotate the mold station into a position adjacent an article-release work station, removing the article from the mold cavity and indexing the carrousel to rotate the mold station into at least one additional position following the release station and prior to the parison-extrusion station.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
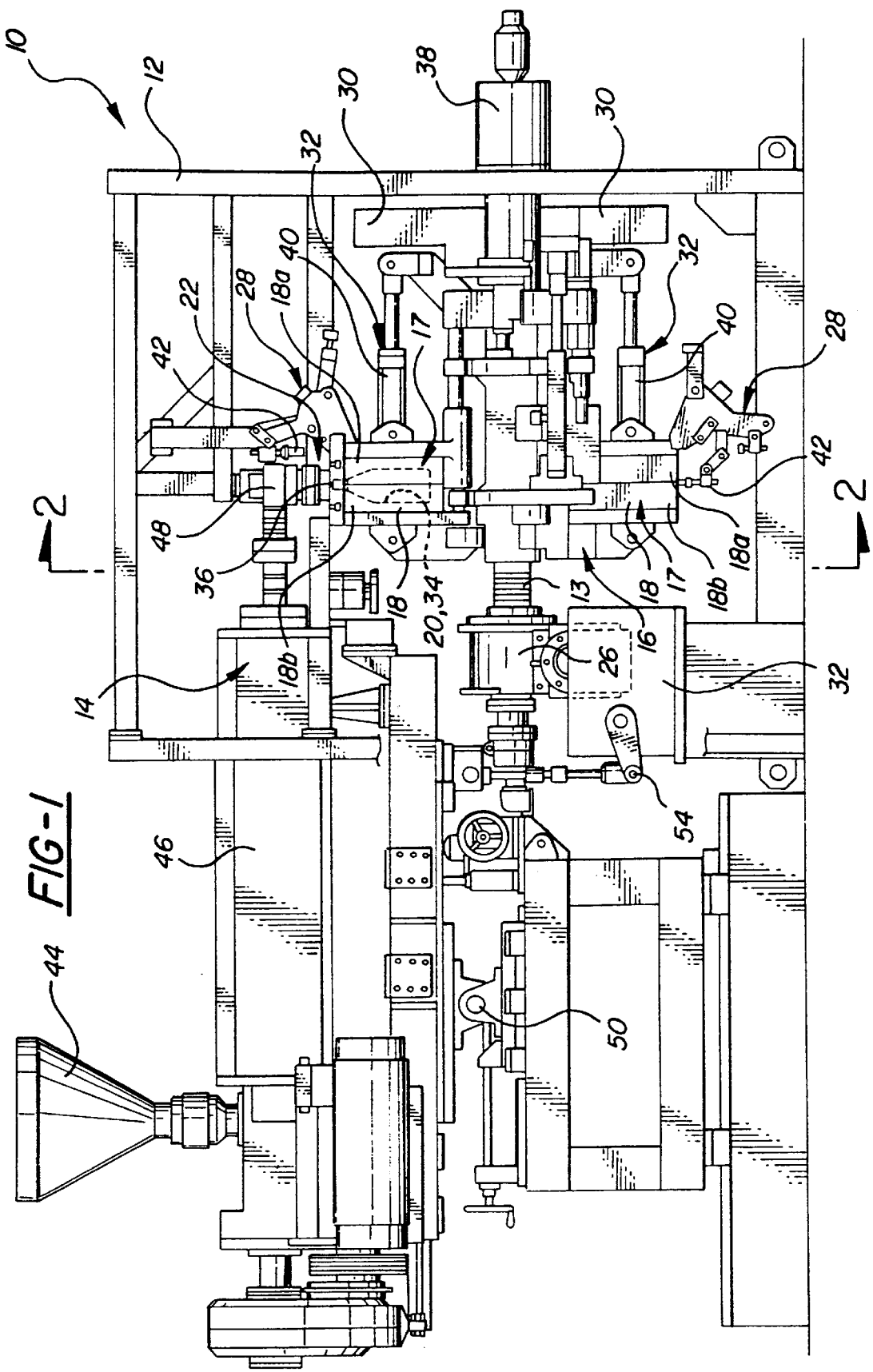
FIG. 1 is a front view of a rotary blow molding apparatus constructed in accordance with the present invention.
Figure 2:
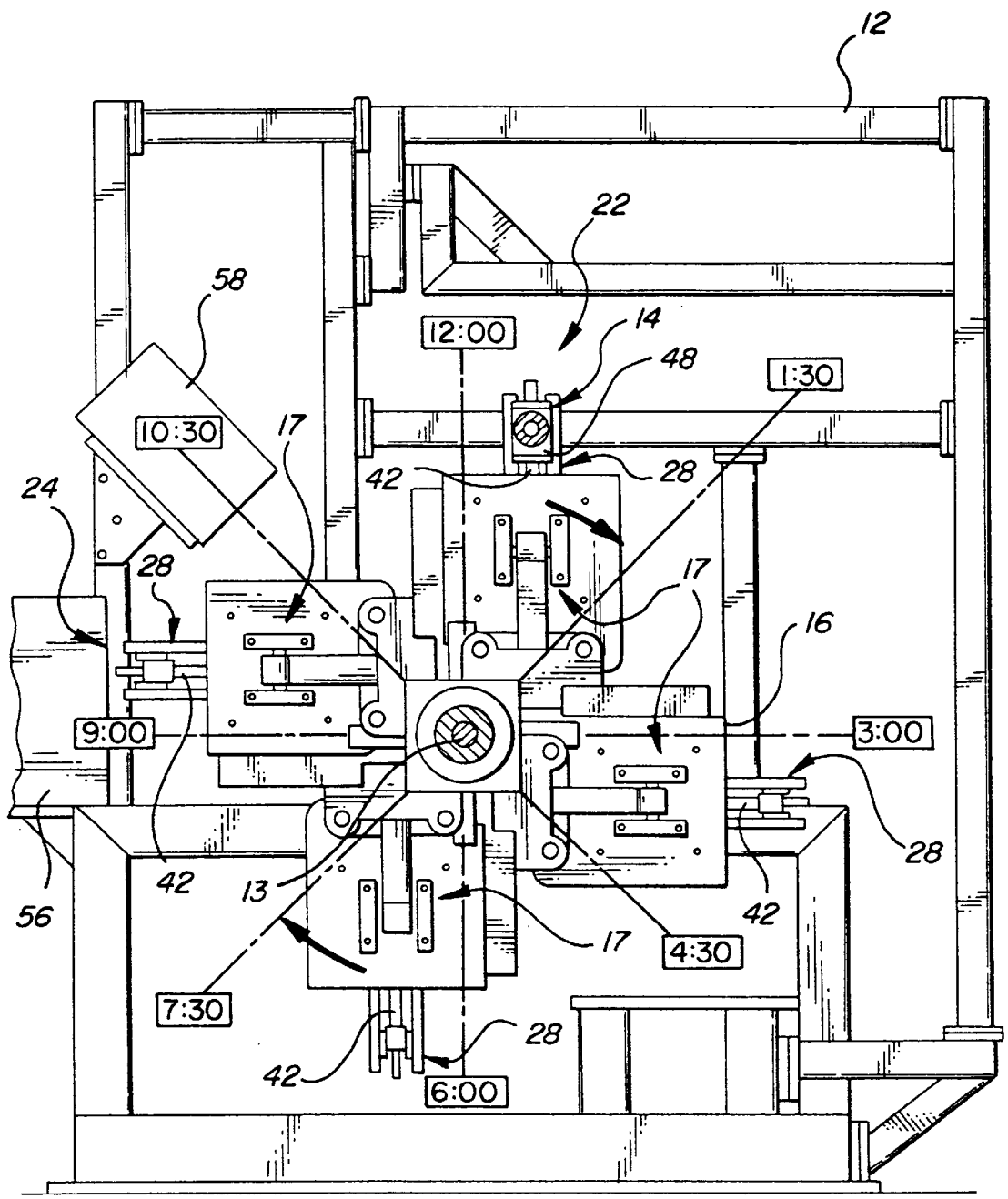
FIG. 2 is a cross-sectional end view taken along line 2—2 of FIG. 1.

A rotary blow-molding apparatus of the type for blow-molding hollow articles is generally shown at 10 in FIG. 1. The blow-molding apparatus includes a support frame 12, a parison extruder 14 and a carrousel 16. The carrousel 16, as shown in FIGS. 1 and 2, carries four mold stations 17 and is supported on the frame 12 along axle 13 to rotate about a central axis. The four mold stations 17 are supported on and rotate with the carrousel 16 around a circular mold station path. Each mold station 17 includes one mold 18. The extruder 14 is supported on the frame 12 and extrudes parison into each mold 18 at each mold station 17. As is best shown in FIG. 1, each mold 18 includes a mold cavity 20 adapted to receive the parison and form the exterior shape of the article during blow molding.

As is best shown in FIG. 2, two blow-molding work stations 22, 24 are disposed adjacent the mold station path in fixed positions relative to the frame 12, i.e., the 12:00 and the 9:00 positions relative to the mold station path, respectively. As shown in FIG. 1, an indexer 26 is operatively connected to the carrousel 16 and is adapted to momentarily halt the carrousel 16 in a number of indexing positions. The indexing positions and work stations 22, 24 are angularly spaced to cause each of the mold stations 17 to momentarily halt adjacent each of the work stations 22, 24. The mold stations 17 each halt adjacent each work station 22, 24 to allow blow-molding operations to be performed on the article within each mold 18 at each work station 22, 24.

As shown in FIGS. 1 and 2 the carrousel assembly 16 includes the four mold stations 17 and four blow pin assemblies 28. As shown in FIG. 2, the carrousel assembly 16 also includes hydraulic manifolds 30, and hydraulic press assemblies 32 for opening and closing the molds 18—all supported around the carrousel axle 13 to rotate around the central axis.

The four mold stations 17 are evenly-spaced around the axle 13. As shown in FIG. 1, each mold 18 includes two mold halves: a front half 18*a* and a back half 18*b*. Each mold half 18*a*, 18*b* has an inner surface with a hollowed-out portion 34. When the inner surfaces of the two halves are pressed together, the hollowed-out portions 34 join to form the mold cavity 20. The mold cavity 20 defines the exterior shape of the blow-molded articles to be produced.

The mold halves 18*a*, 18*b* are slidably mounted opposite one another so that they may be repeatedly slid together and apart during the blow-molding process. When the mold halves 18*a*, 18*b* are joined together, a single mold opening 36 remains at the top of the joined mold 18.

The hydraulic press assembly 32 includes an electric hydraulic pump 38 that provides hydraulic pressure through the hydraulic manifolds 30 to four hydraulic rams 40. Each hydraulic ram 40 is connected to the slidably-mounted front half 18*a* of one of the molds 18. The hydraulic rams 40 open each mold 18 as it passes from the 8:00 to the 9:00 position of the mold station path. The rams 40 close their respective molds 18 as they depart the 12:00 position of the mold station path.

One example of a mold station with hydraulic rams and slidably-mounted mold halves according to the present invention is disclosed in greater detail in U.S. Pat. No.

4,421,472, issued to Martin, Jr., assigned to the assignee of the present invention and incorporated herein by reference.

Each of the four blow-pin assemblies 28 is mounted on one of the four mold stations 17 adjacent the front mold-half 18a of one of the four molds 18 as shown in FIG. 1. In other words, each mold 18 carries its own blow-pin assembly 28. Each of the four blow-pin assemblies 28 supports a blow pin 42.

Each blow pin assembly 28 is adapted to move its respective blow pin 42 vertically in and out of its respective mold opening 36 from a vertical insertion position directly over the mold opening 36. This allows each blow pin assembly 28 to insert its pin 42 into the extruded parison extending into the mold cavity 20 through the mold opening 36, inject air to inflate the parison, then remove the pin 42. Each blow pin assembly 28 inserts its blow pin 42 into its respective mold cavity 20 when its respective mold 18 pauses in the 1:30 position of the mold station path shown in FIG. 2. Each blow pin assembly 28 withdraws its blow pin 42 at the approximate 8:00 position shown in FIG. 2.

Each blow pin assembly 28 is additionally adapted to move its respective blow pin 42 laterally into and away from the vertical-insertion position. Each blow pin assembly 28 moves its pin 42 into the vertical-insertion position prior to lowering the pin 42 vertically into the extruded parison in the mold opening 36. Each blow pin assembly 28 retracts its pin 42 radially-outward and away from the vertical-insertion position to prevent the blow pin 42 from striking the extruder 14 as the mold station 17 that the blow pin 42 is mounted on rotates into the 12:00 position. The blow pin assemblies 28 may be of the type disclosed in U.S. Pat. No. 4,919,607 to Martin et al., assigned to the assignee of the present invention and incorporated herein by reference.

The blow pins 42 receive air from a source of pressurized air. The air is fed in a conventional manner to blow pins 42 using a manifold within axle 13, a pair of rotational pneumatic couplings (not shown) to provide and receive the air from the manifold, and tubes (not shown) to deliver the air to the blow pins. The blow pins 42 are hollow, allowing air to pass through them and into the parison. The injected air expands and stretches the molten parison outwardly until the parison contacts and conforms itself to the inner walls of the mold cavity 20.

The blow molding work stations 22, 24 are supported at fixed locations around the mold station path. The work station positions are fixed in relation to the frame 12. Each work station 22, 24 includes structures external to the carrousel 16 that perform operations on the molds 18 or blow-molded articles contained in the molds 18.

The blow-molding work station 22 at the 12:00 position of the mold station path includes a parison extruder 14. The extruder 14 includes a hopper 44 for receiving parison pellets, a parison heater 46 that heats the pellets until they melt, and, as shown in both FIGS. 1 and 2, an extrusion head 48 that extrudes a molten parison into each of the mold cavities 20. The extrusion head 48 is reciprocally supported on the frame 12 above the mold station path at the mold station path's 12:00 position.

The reciprocal motion is necessary to move the extrusion head 48 out of the mold station path and prevent a collision as each mold station 17 rotates into the 12:00 position. To produce the reciprocal motion, the extruder 14 is mounted on a pivot 50. An extruder lift cam box 52 is operatively connected to the extruder 14 through a mechanical linkage 54, and causes the extruder 14 to rock back and forth on the pivot 50. The distance between the pivot 50 and the extrusion head 48 is great enough so that the rocking motion produces an essentially vertical up-and-down reciprocal motion at the extrusion head 48.

The blow-molding work station 24 at the 9:00 position of the mold station path includes an article take-out mechanism as shown at 56 in FIG. 2. The take-out mechanism 56 may be one of a number of such mechanisms known in the art to be capable of sequentially removing articles from the molds of rotary blow-molding carrousels. An example of such a rotary take-out mechanism is disclosed in U.S. Pat. No. 4,902,217 to Martin et al., assigned to the assignee of the present invention and incorporated herein by reference. The take-out mechanism 56 removes articles from the molds 18 as each mold station 17 halts in the 9:00 position of the mold station path.

During each carrousel revolution, the indexer 26 momentarily halts the carrousel 16 in twice as many indexing positions as there are mold stations. This additional indexing creates four additional pause positions for each mold station 17 as it travels around the mold station path, i.e., the 1:30, 4:30, 7:30 and 10:30 positions of the mold station path.

The additional pause positions allow additional operations to be carried out on the articles between blow-molding work stations 22 and 24. This maximizes the portion of the mold station path used for blowing and cooling, yet provides an additional work station for in-mold labeling to be carried out. In other words, additional indexing positions allow additional operations to be carried-out on each mold 18 without inefficiently compressing other blow-molding operations into the early portion of the mold station path.

Therefore, the indexer 26 pauses the four-mold-station carrousel 16 in a total of eight indexing positions per revolution. This causes each of the four mold stations 17 to pause in each of each of eight (12:00, 1:30, 3:00, 4:30, 6:00, 7:30, 9:00 and 10:30) positions around the mold station path, once during each complete 360 degree carrousel rotation.

As shown in FIG. 2, an in-mold labeler 58 is disposed adjacent the carrousel circumference and is adapted to insert a label into each mold 18 when the mold 18 pauses at the 10:30 position of the mold station path. Each mold station 17 pauses at the 10:30 position immediately after it leaves the 9:00 release work station 24 and immediately before it arrives at the 12:00 parison-extrusion work station 22. The in-mold labeler 58 may be of any type known in the art—including the type that affixes the label to the walls of a mold cavity by vacuum suction.

In practice, the carrousel 16 is indexed to sequentially rotate each mold station 17 into a position beneath the extrusion head 48 at the parison-extrusion work station 22 with the mold halves 18a, 18b open. There, the extruder 14 sends molten parison through the extrusion head 48 and extrudes a length of the parison between the mold halves 18a, 18b. The mold halves 18a, 18b then close together around the extruded length of parison, clamping the parison at the mold opening 36 and suspending it in the mold cavity 20. At the 1:30 position, each respective blow pin assembly 28 inserts its blow pin into the molten parison clamped in the mold opening 36, and begins injecting air into the parison. Air is being blown into the molten parison as each mold station 17 rotates between the 3:00 and the 7:30 positions. At the approximate 8:00 position, each blow pin assembly 28 vertically extracts and laterally retracts its blow pin 42. The carrousel 16 then completes its indexing of each mold station 17 into a position adjacent the article-release work station 24 located at the 9:00 position of the mold station path. There, the mold halves separate and the take-out mechanism 56 removes the article from the mold cavity 20. The carrousel 16 is then indexed to rotate each mold cavity 20 into a position past the release work station 24 and prior to the parison-injection work station 22, i.e. the 10:30 position of the mold station path. There, an in-mold-labeling device 58 inserts a label into the open mold 18. Following label-insertion, the open mold 18 advances back to the parison-extrusion work station 22 at the 12:00 position of the mold station path.

In other embodiments of the present invention there may be more than four, or as few as two mold stations 17. Moreover, each mold station 17 may include more than one mold 18. There could also be more than two blow-molding work stations, i.e., more than two external blow molding operations may be carried out on each mold station 17 or article during each carrousel rotation. Other embodiments may also include operations other than in-mold-labeling at the additional mold station pause positions around the mold station path.

Unlike prior art rotary blow molding machines that index a number of times equal to the number of mold stations, a rotary blow molding machine constructed according to the present invention doubles carrousel indexing without increasing the number of mold stations. Therefore, according to this invention, larger molds with larger cavities or with more molds per mold station may be used, for a given carrousel size and for a given number of pause positions around the mold station path.

This is an illustrative description of the invention using words of description rather than of limitation. Obviously, many modifications and variations of this invention are possible in light of the above teachings. Within the scope of the claims one may practice the invention other than as described.

We claim:

1. A method for molding articles including the steps of:
providing a rotary blow-molding assembly including a carrousel supported to rotate around a central axis, at least two mold stations supported on the carrousel to revolve about the central axis, each mold station including at least one mold;
rotating the carrousel into a first indexing position that pauses a selected one of the mold stations in a position adjacent a first work station;
rotating the carrousel into a second indexing position that pauses the selected mold station in a position adjacent a second work station; and
rotating the carrousel into an additional number of indexing positions and pausing the carrousel in each of the additional number of indexing positions such that the total number of carrousel indexing positions is equal to at least twice the number of mold stations supported on the carrousel whereby each mold station is paused in at least one position following the first work station and prior to the second work station during each 360° mold station revolution.

2. A method as set forth in claim 1 including the steps of:
providing parison in a mold cavity in the selected mold station when the selected mold station is paused in a position adjacent the first work station;
injecting air into the parison to form the parison into a hollow article; and
removing the article from the mold cavity when the selected mold station is paused in a position adjacent the second work station.

3. A method for molding articles using a rotary blow-molding assembly having a support frame, a carrousel supported on the frame to rotate about a central axis, at least two mold stations supported on the carrousel, each mold station including at least one mold, the method including the steps of:
rotating the carrousel into a first indexing position that pauses a selected one of the mold stations in a position adjacent a parison-extrusion work station;
providing parison in a mold cavity in the selected mold station;
injecting air into the parison to form the parison into a hollow article;
rotating the carrousel into a second indexing position that pauses the selected mold station in a position adjacent an article-release work station;
removing the article from the mold cavity; and
rotating the carrousel into at least one additional indexing position that pauses the selected mold station in a position between the article-release work station and the parison-extrusion work station, the carrousel being paused in a number of indexing positions equal to at least twice the number of mold stations supported on the carrousel.

4. A method as set forth in claim 3 including the step of: providing an additional work station between the article-release work station and the parison-extrusion work station, and in which the step of rotating the carrousel into at least one additional indexing position includes the additional step of pausing the selected mold station in a position adjacent the additional work station.

5. A method as set forth in claim 4 including the step of performing an additional operation on the selected mold station following the step of pausing the selected mold station in a position adjacent the additional work station.

6. A method as set forth in claim 5 including the steps of:
rotating the carrousel in the same direction out of each indexing position; and
pausing the selected mold station adjacent the additional work station after pausing the selected mold station at the article release work station and prior to pausing the selected mold station at the parison extrusion work station.

7. A method as set forth in claim 6 including the step of inserting at least one label into the mold cavity after the carrousel has rotated into the indexing position in which the mold cavity is disposed adjacent the additional work station.

8. A method as set forth in claim 3 in which the steps set forth in claim 3 are performed using at least one other of the mold stations.

9. A method for molding articles using a rotary blow-molding assembly having a support frame, a carrousel supported on the frame to rotate about a central axis, at least two mold stations supported on the carrousel, each mold station including at least one mold, the method including the steps of:
rotating the carrousel into a first indexing position that pauses a selected one of the mold stations in a position adjacent a parison-extrusion work station;
providing parison in a mold cavity in the selected mold station;
injecting air into the parison to form the parison into a hollow article;
rotating the carrousel into a second indexing position that pauses the selected mold station in a position adjacent an article-release work station;

removing the article from the mold cavity; and rotating the carrousel into at least one additional indexing position that pauses the selected mold station in a position between the article-release work station and the parison-extrusion work station, the carrousel being paused in a number of indexing positions equal to twice the number of mold stations supported on the carrousel.

10. A method as set forth in claim 9 including the step of providing a rotary blow-molding assembly wherein each mold station includes at least two molds.

11. A method for molding articles including the steps of:

providing a rotary blow-molding assembly having a support frame, a carrousel supported on the frame to rotate about a central axis, at least two mold stations supported on the carrousel, each mold station including at least one mold;

rotating the carrousel into a first indexing position that pauses a selected one of the mold stations in a position adjacent a parison-extrusion work station;

providing parison in a mold cavity in the selected mold station;

injecting air into the parison to form the parison into a hollow article;

rotating the carrousel into a second indexing position that pauses the selected mold station in a position adjacent an article-release work station;

removing the article from the mold cavity; and rotating the carrousel into at least one additional indexing position that pauses the selected mold station in a position between the article-release work station and the parison-extrusion work station, the carrousel being paused in a total number of indexing positions equal to at least twice the number of mold stations supported on the carrousel.

12. A method as set forth in claim 11 including the step of providing an additional work station between the article-release work station and the parison-extrusion work station, and in which the step of rotating the carrousel into at least one additional indexing position includes the additional step of pausing the selected mold station in a position adjacent the additional work station.

13. A method as set forth in claim 12 including the step of performing an additional operation on the selected mold station following the step of pausing the selected mold station in a position adjacent the additional work station.

14. A method as set forth in claim 13 including the steps of:

rotating the carrousel in the same direction out of each indexing position; and pausing the selected mold station adjacent the additional work station after pausing the selected mold station at the article release work station and prior to pausing the selected mold station at the parison extrusion work station.

15. A method as set forth in claim 14 including the steps of:

providing an in-mold labeler at the additional work station; and inserting at least one label into the mold cavity of the selected mold station after the step of rotating the carrousel into an indexing position in which the mold cavity is disposed adjacent the additional work station.

16. A method for molding articles including the steps of:

providing a rotary blow-molding assembly having a support frame, a carrousel supported on the frame to rotate about a central axis, at least two mold stations supported on the carrousel, each mold station including at least one mold;

rotating the carrousel into a first indexing position that pauses a selected one of the mold stations in a position adjacent a parison-extrusion work station;

providing parison in a mold cavity in the selected mold station;

injecting air into the parison to form the parison into a hollow article;

rotating the carrousel into a second indexing position that pauses the selected mold station in a position adjacent an article-release work station;

removing the article from the mold cavity; and rotating the carrousel into at least one additional indexing position that pauses the selected mold station in a position between the article-release work station and the parison-extrusion work station, the carrousel being paused in a number of indexing positions equal to twice the number of mold stations supported on the carrousel.

* * * * *